(12) United States Patent
Herberholt (10) Patent No.: US 8,459,850 B2
(45) Date of Patent: Jun. 11, 2013

(54) INTERIOR LIGHT ASSEMBLY

(75) Inventor: Steven James Herberholt, St. Charles, MO (US)

(73) Assignee: Code 3, Inc., St. Louis, MO (US)

( * ) Notice: Subject to any disclaimer, the term of this patent is extended or adjusted under 35 U.S.C. 154(b) by 268 days.

(21) Appl. No.: 13/103,780

(22) Filed: May 9, 2011

(65) Prior Publication Data

US 2012/0287662 A1    Nov. 15, 2012

(51) Int. Cl.
*B60Q 1/40*    (2006.01)
*B60Q 1/26*    (2006.01)

(52) U.S. Cl.
USPC ........................................ 362/542; 362/549

(58) Field of Classification Search
USPC ........................ 362/523, 528, 540, 542–549
See application file for complete search history.

(56) References Cited

U.S. PATENT DOCUMENTS

| | | | |
|---|---|---|---|
| 4,222,092 A | 9/1980 | Bray | |
| 4,575,782 A | 3/1986 | Levine et al. | |
| 4,654,757 A | 3/1987 | Birkhauser | |
| 4,734,675 A | 3/1988 | Wen | |
| 4,751,493 A | 6/1988 | Miller | |
| 4,851,970 A | 7/1989 | Bronder | |
| D304,504 S | 11/1989 | Chen | |
| D313,480 S | 1/1991 | Criswell | |
| 5,319,530 A | 6/1994 | Kreutzer et al. | |
| 5,486,808 A | 1/1996 | Nejdl | |
| 6,264,354 B1 | 7/2001 | Motilal | |
| 7,093,959 B2 | 8/2006 | Tsao | |
| 7,106,185 B1 | 9/2006 | Neufeglise | |
| 7,325,938 B2 | 2/2008 | Yoshida et al. | |
| D617,929 S | 6/2010 | Kuo | |
| 7,771,092 B2 * | 8/2010 | Yeh | 362/351 |
| 7,804,420 B2 * | 9/2010 | Girouard | 340/815.4 |
| D629,548 S | 12/2010 | Cai et al. | |
| 7,850,349 B2 * | 12/2010 | Ekladyous et al. | 362/490 |
| 2002/0109999 A1 * | 8/2002 | Strickland | 362/542 |

OTHER PUBLICATIONS

Crossfire LED & Safety Products: Dash & Deck Singles, CROSSFIREDLED.Com, p. 1 of 2, 2009 retrieved on Feb. 8, 2012.
Cross Fire LED & Safety Products—"X2 Dual Linear LED Emergency Warning Windshield Mount and Dash Light", CROSSFIRELED.Com, p. 1 of 2, 2009,—retrieved on Feb. 8, 2012.
Powell Emergency Vehicle Upfitting Whelen® dash lights and signal® dash light, Powellemergencyvehicleupfitting.ecrater.com, 1 page, 2008, retrieved on Feb. 8, 2012.
U.S. Appl. No. 29/391,478 Office action dated Feb. 13, 2012, 11 pages.
U.S. Appl. No. 29/391,472 Office action dated Feb. 17, 2012, 11 pages.
U.S. Appl. No. 29/391,473 Office action dated Feb. 17, 2012, 11 pages.

* cited by examiner

*Primary Examiner* — Karabi Guharay
*Assistant Examiner* — Nathaniel Lee
(74) *Attorney, Agent, or Firm* — Senniger Powers LLP (57) ABSTRACT

An interior light assembly for use in a vehicle includes a housing having a light transmission end constructed to pass light out of the housing. A light source is located in the housing and arranged to emit light in a direction to pass out of the light transmission end of the housing. A visor extends from the light transmission end of the housing for blocking light from the light source in directions transverse to the light transmission end of the housing into a passenger compartment of the vehicle. The visor has an end remote from the housing shaped to engage a windshield of the vehicle. The visor may be pivotably mounted on the housing to facilitate flush engagement of the remote visor end with the windshield. The visor can flare outwardly from the housing to the remote end so light can be seen at greater off-angles by persons outside the vehicle.

19 Claims, 12 Drawing Sheets

INTERIOR LIGHT ASSEMBLY

FIELD OF THE INVENTION

The present invention generally relates to lighting useful on vehicles, and, in particular, to a light assembly for mounting in the interior of a vehicle.

BACKGROUND OF THE INVENTION

Emergency lighting on police or other public service vehicles has been used for many years to signal to pedestrians and other motorists. Warning light signals can be used, for example, to clear the right of way or to warn oncoming motorists of potential moving or stationary hazards, such as a vehicle that is stopped or a vehicle moving slower or faster than the rate of traffic. Often, the emergency lighting assemblies are mounted on the exterior of the public service vehicles to provide high visibility and avoid adversely affecting the vision of the vehicle occupants. However, emergency lighting assemblies that are mounted in the interior of the public service vehicles are known in the art, such as for unmarked law enforcement vehicles. Interior light assemblies can supplement exterior light assemblies. Interior light assemblies such as those known in the art have some disadvantages.

One disadvantage of the prior art interior light assemblies is the problem of flashback, or light reflecting back into the passenger compartment of the vehicle. In order to prevent flashback, the interior light assembly must have a substantially flush engagement with the windshield of the vehicle. A visor is often placed around the light to block flashback, but the visor will not be completely effective unless it has a flush engagement with the windshield. Another disadvantage of the prior art is the limited range from which the light is visible to persons outside the vehicle. As a result of attempts to prevent flashback, the visor is often positioned such that it blocks a range of light that would be useful to the user.

SUMMARY OF THE INVENTION

In one aspect of the present invention, an interior light assembly for use in a vehicle generally comprises a housing having a light transmission end constructed to pass light out of the housing. A light source located in the housing is arranged for emitting light in a direction to pass out of the light transmission end of the housing. A visor extending from the light transmission end of the housing blocks light from the light source in directions transverse to the light transmission end of the housing into a passenger compartment of the vehicle. The visor has an end remote from the housing shaped to engage a windshield of the vehicle. The visor is pivotably mounted on the housing to facilitate flush engagement of the remote visor end with the windshield.

In another aspect, an interior light assembly for use in a vehicle generally comprises a housing having a light transmission end constructed to pass light out of the housing. A light source located in the housing is arranged for emitting light in a direction to pass out of the light transmission end of the housing. A light visor is mounted on the housing and extends from the light transmission end of the housing to block light from the light source in directions transverse to the light transmission end of the housing into a passenger compartment of the vehicle. The visor has an end remote from the housing shaped to engage a windshield of the vehicle. The visor flares outward in a direction from the housing toward the remote end of the visor.

In still another aspect, an interior light assembly for use in emergency vehicles generally comprises a housing having a light transmission end constructed to pass light out of the housing. A mounting assembly is disposed on a top surface of the housing and is adapted to be releasably attached to the interior of the emergency vehicle. A light source is located in the housing and is arranged for emitting light in a direction to pass out of the light transmission end of the housing and through a windshield of the emergency vehicle. A visor extends from the light transmission end of the housing to block light from the light source in directions transverse to the light transmission end of the housing into a passenger compartment of the emergency vehicle. The visor has an end remote from the housing shaped to engage a windshield of the vehicle. The visor is pivotably mounted on the housing to facilitate flush engagement of the remote visor end with the windshield. In addition, the visor flares outward in a direction from the housing toward the remote end of the visor.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
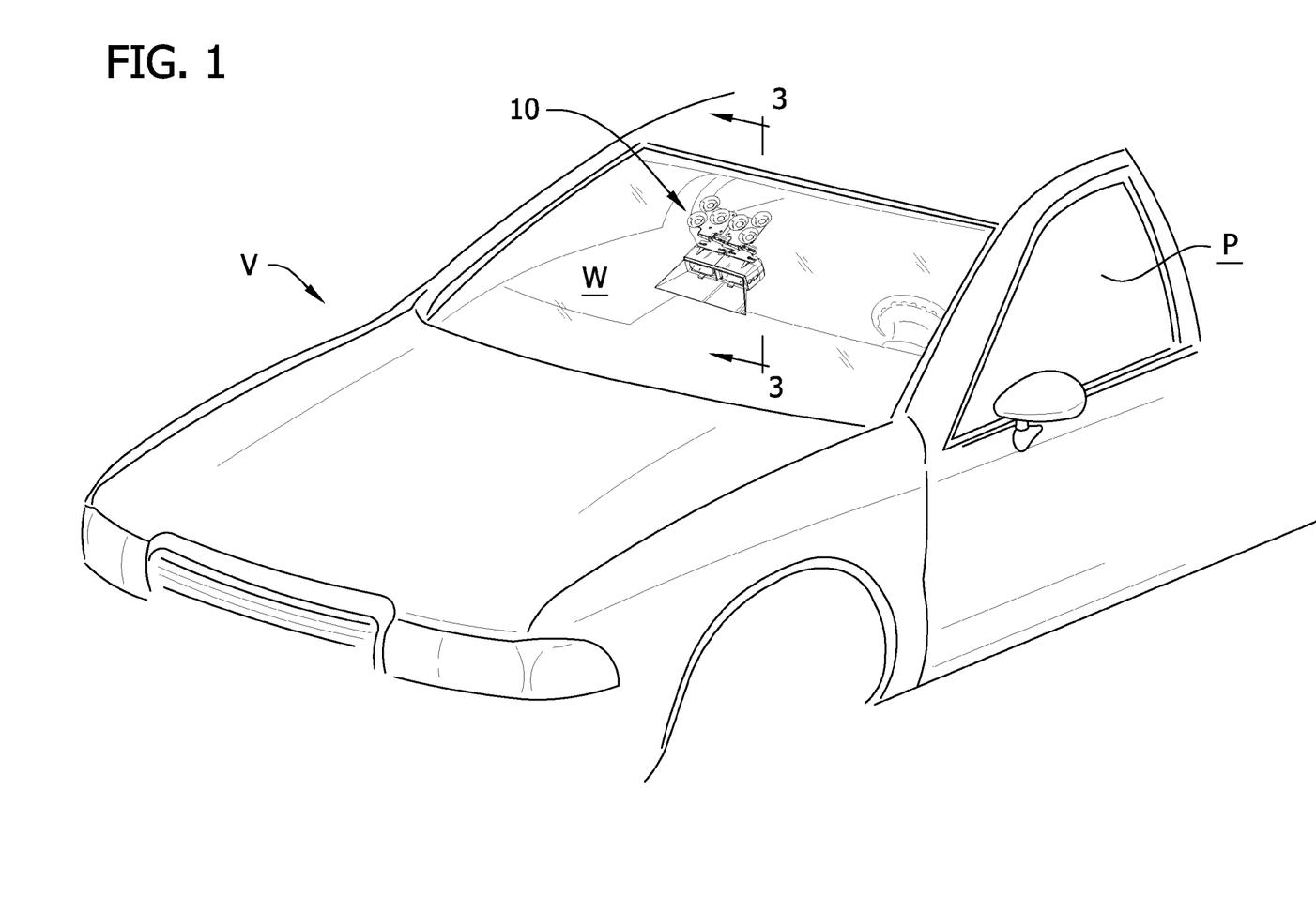
FIG. 1 is a perspective of an interior light assembly of the present invention mounted on a windshield of a vehicle.
Figure 2:
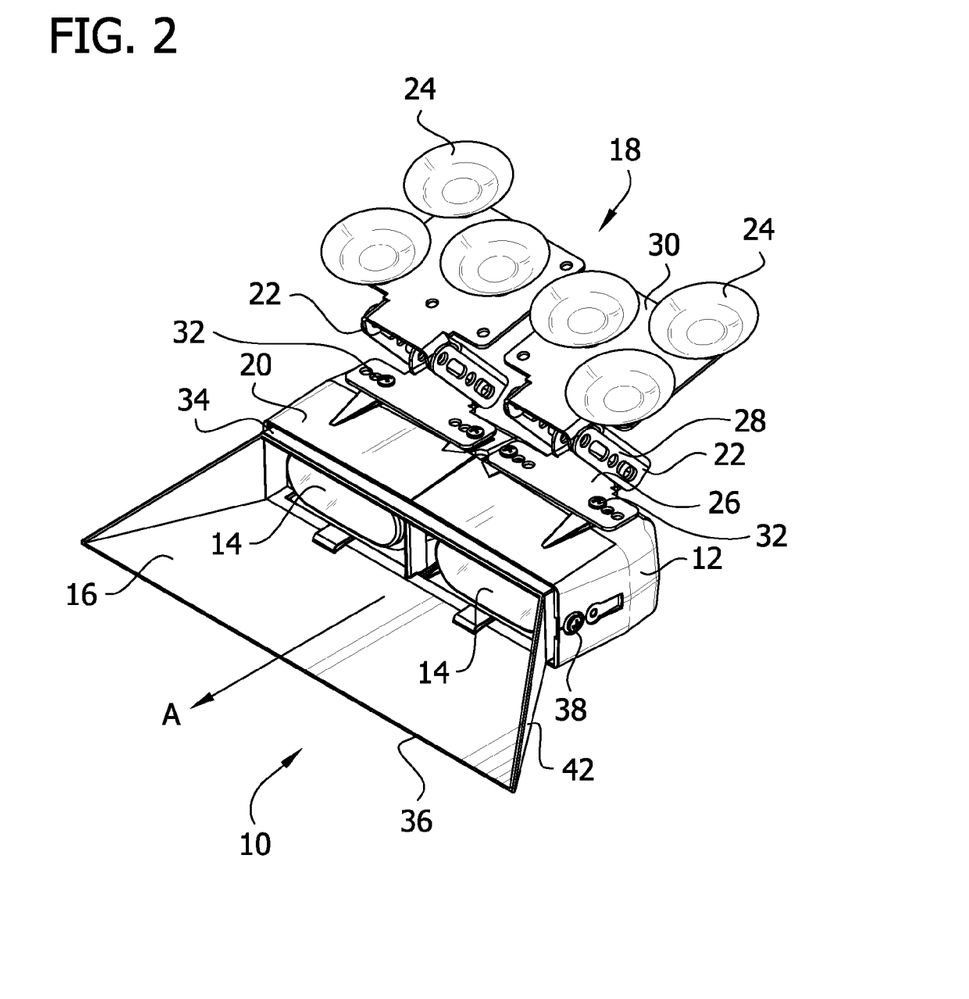
FIG. 2 is a perspective view of the interior light assembly.
Figure 3:
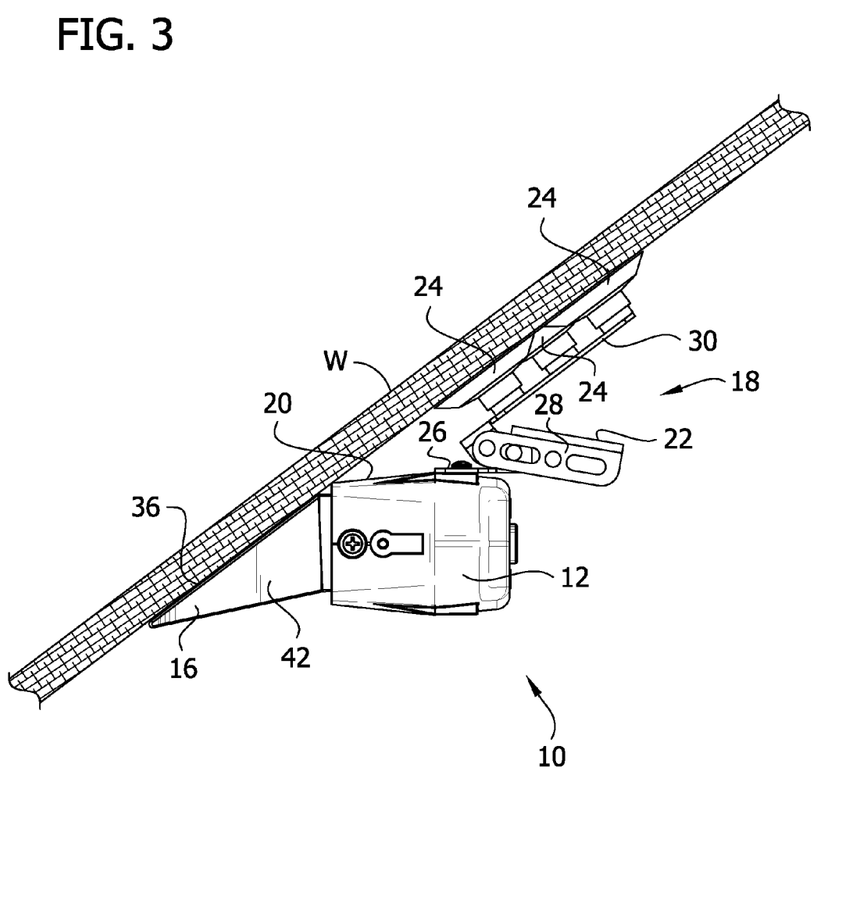
FIG. 3 is a fragmentary section taken in the plane including line 3-3 of FIG. 1.
Figure 4:
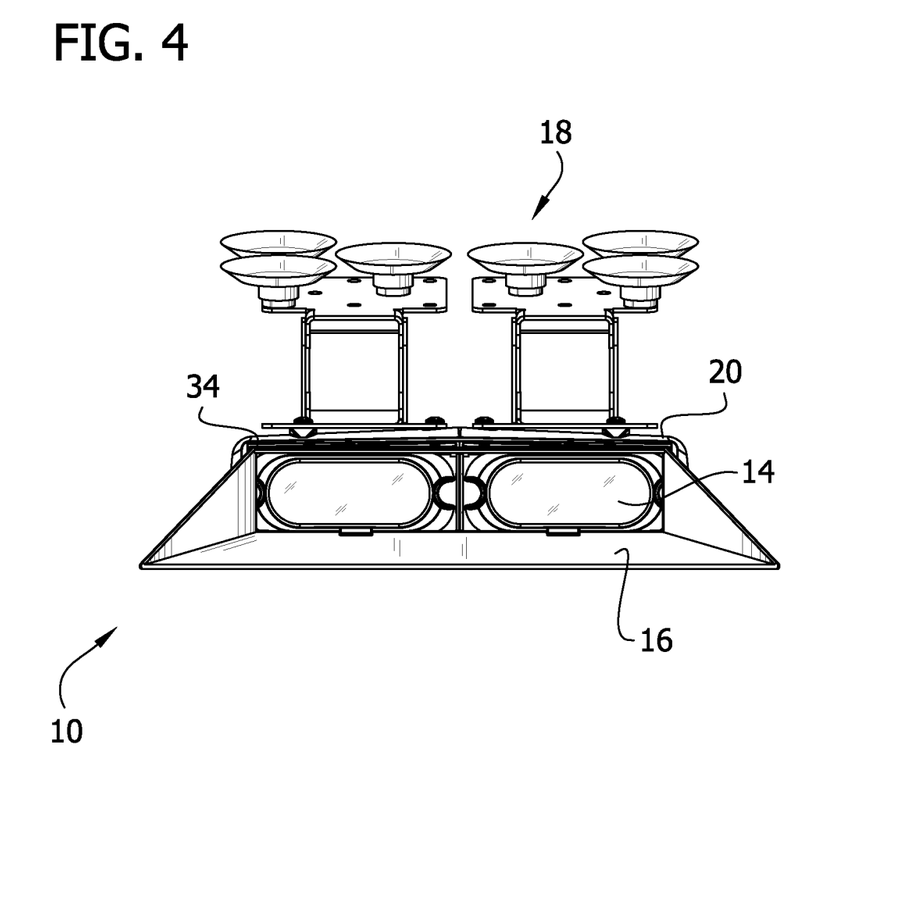
FIG. 4 is a front view of the interior light assembly.

Referring to FIGS. 1-3, an interior light assembly generally indicated at 10 is releasably attached to an interior surface of a windshield W of a vehicle V. The interior light assembly 10 can be used in any type of vehicle, and particularly in emergency vehicles such as police, ambulance, fire truck, towing, or wrecking vehicles. The interior light assembly 10 includes a housing 12, light sources 14 disposed in the housing, a visor 16 pivotally attached to the housing, and a mounting assembly 18 for releasably attaching the light assembly to the windshield W (see generally FIGS. 1 and 2). The light sources 14 direct light out of the housing 12 and through the windshield W of the vehicle V. The visor 16 blocks light from reflecting back into the passenger compartment P of the vehicle V.

Figure 9:
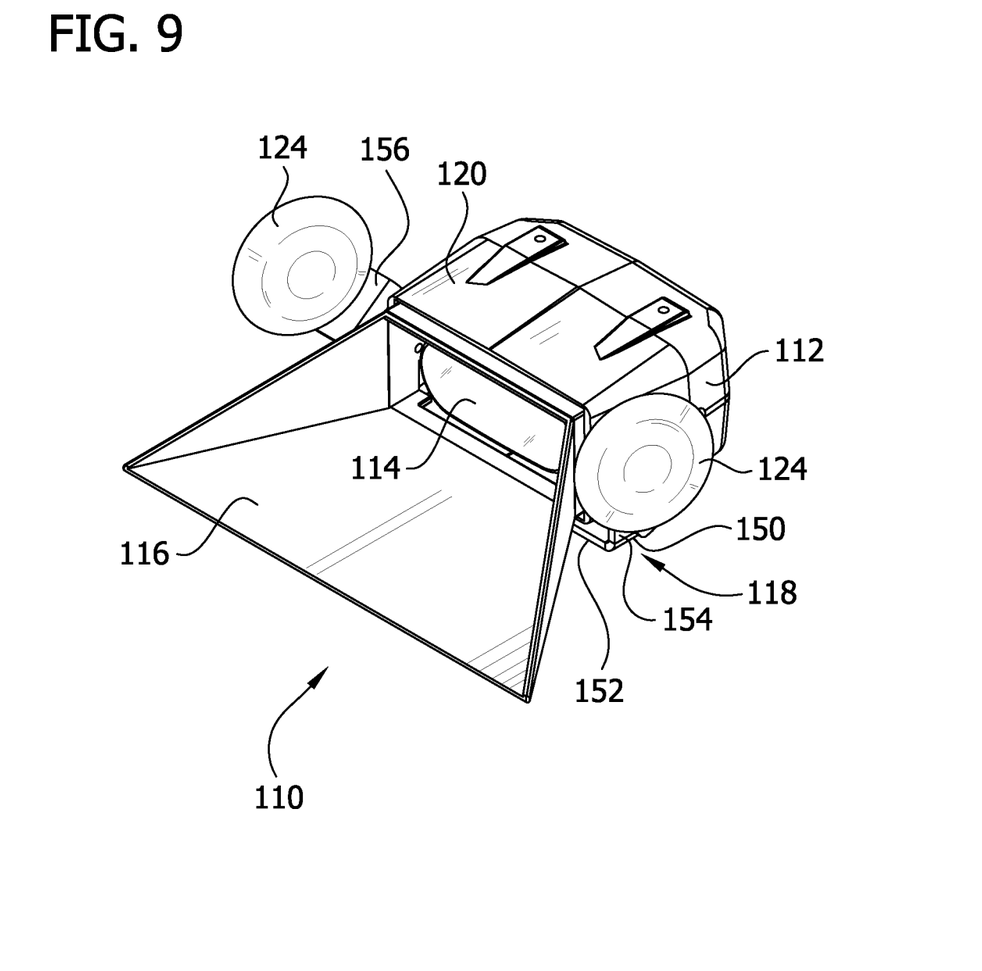
FIG. 9 is a perspective view of a second embodiment of the interior light assembly.

The light sources 14 can include any kind of light known in the art. In the illustrated embodiment, LED lights (not shown) are used. The light sources 14 can comprise one light or several lights (see, for example, FIG. 9, showing one light). The lights can be programmable for different flash patterns or steady burn. A switch located on the housing may allow the user to select the flash patterns of the lights (see FIG. 10). Different color lights, such as red, blue, amber, white, or green, can be used in the interior light assembly. The light source 14 can include several lights having different colors. The light source 14 can be powered by any suitable means, such as at least one self-contained battery or by being connected to the vehicle electric power system (not shown).

The housing 12 and the visor 16 can be made of any suitable material, such as plastic or more specifically, polycarbonate. The housing 12 and the visor 16 can be formed as one piece, but more preferably are formed separately. The housing 12 can include a shroud on the end opposite the visor 16. The shroud can also be made of any suitable material, such as plastic or more specifically, polycarbonate. The housing and the shroud can be formed as one piece or separately. A mounting assembly 18 can be attached to a top surface 20 of the housing 12 for mounting the interior light assembly 10 in the vehicle V. As shown in FIGS. 1-3, the mounting assembly 18 includes a pivotable bracket 22 and suction cups 24 for releasably attaching the light assembly 10 to the windshield W of the vehicle V. The pivotable bracket 22 includes a base 26, a first arm 28, and a second arm 30. The base 26 is attached to the housing 12 by any suitable means, such as by screws 32. The first arm 28 extends from the base 26, and is pivotable relative to the base. The second arm 30 extends from the first arm 28 on an end opposite from the base 26, and the second arm is pivotable relative to the first arm. Suction cups 24 are attached to the second arm 30. As illustrated, the mounting assembly 18 includes two pivotable brackets 22 attached to the top surface 20 of the housing 12. Other mounting assembly configurations are within the scope of the present invention, such as a mounting assembly with a single bracket or a mounting assembly that attaches to the interior of the vehicle by means other than suction cups. The interior light assembly 10 is shown mounted on the front windshield W of the vehicle V, but it is within the scope of the present invention to mount the interior light assembly on any interior location of the vehicle.

Referring to FIGS. 2 and 4-7, the interior light assembly 10 has a housing 12 with a light transmission end 34 constructed to pass light out of the housing. The light source 14 is located in the housing 12 and arranged for emitting light in a direction, generally indicated by arrow A, to shine light out of the light transmission end 34 of the housing. The visor 16 extends from the light transmission end 34 of the housing 12 and blocks light from the light source 14 in directions transverse to the light transmission end of the housing so that the light is not allowed to reflect back into a passenger compartment P of a vehicle V (see FIG. 1). The visor 16 has an end 36 remote from the housing 12. The remote end 36 is shaped to engage a windshield W of a vehicle V (see FIGS. 1-3). In the illustrated embodiment, the remote end 36 is beveled to form an angle so that it can be placed generally flush against the windshield W. As used herein, "flush" does not require exact conformity. The remote end 36 can also be slightly curved to match the contour of a curved windshield.

Figure 5A:
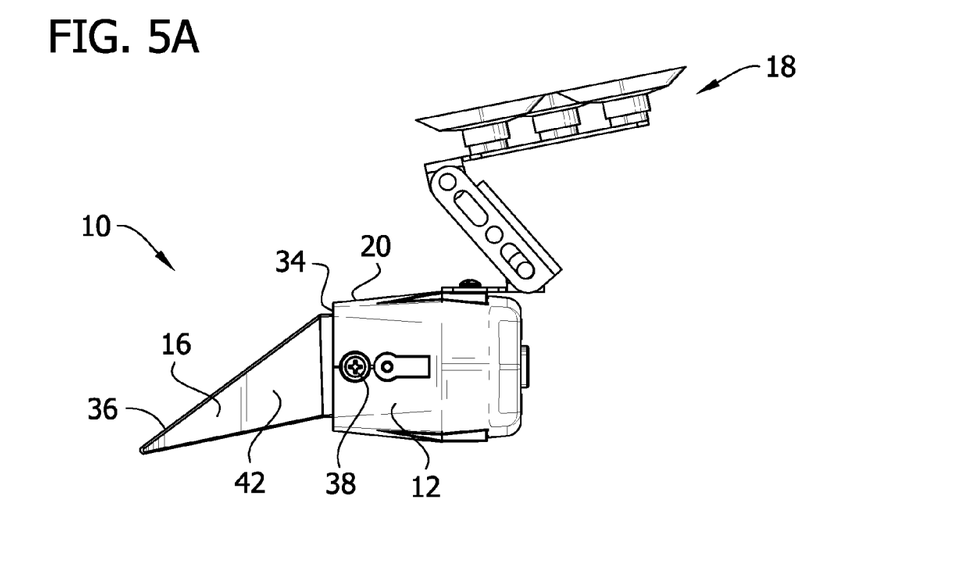
FIG. 5A is a right side view of the interior light assembly, the left side view being a mirror image thereof.
Figure 5B:
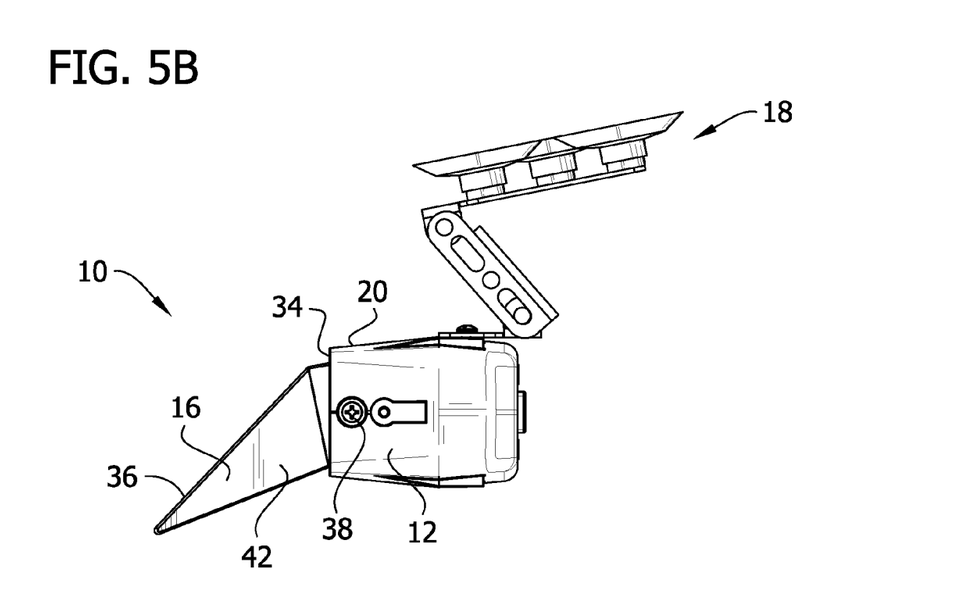
FIG. 5B is a right side view of the interior light assembly illustrating a pivoted position of the visor, the left side view being a mirror image thereof.
Figure 6:
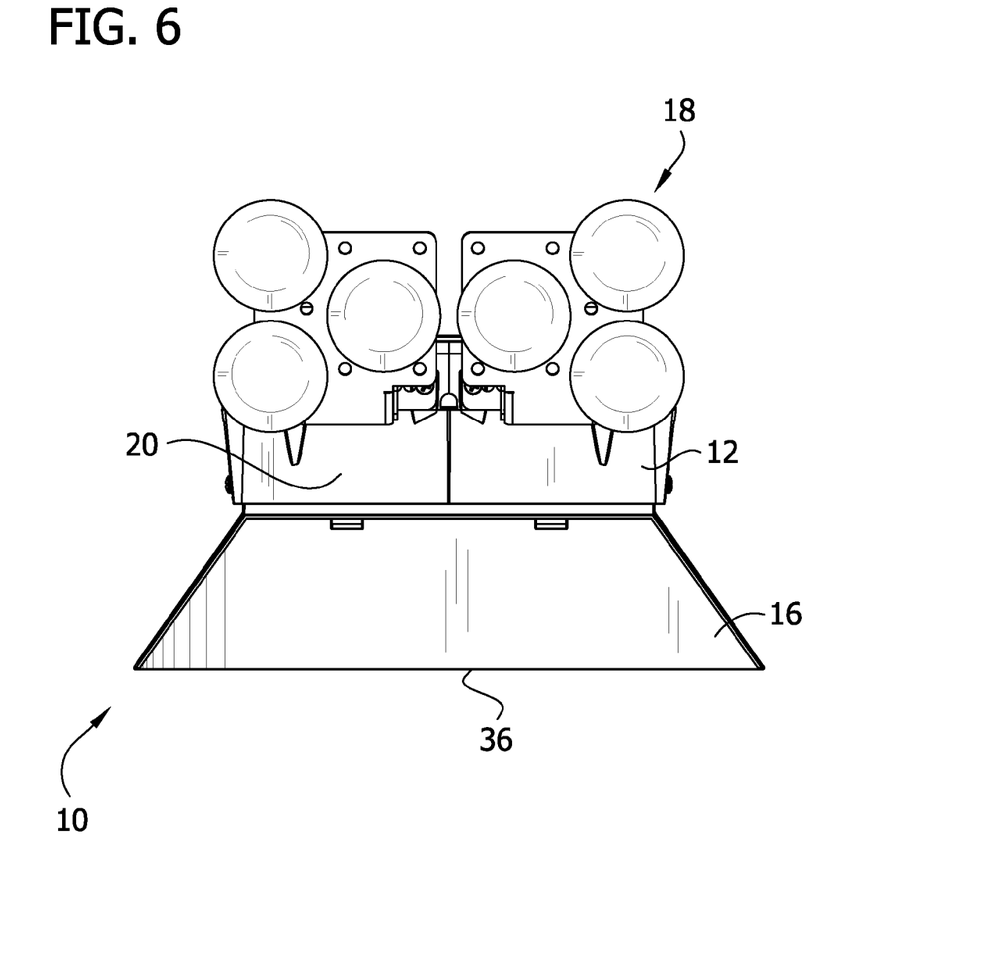
FIG. 6 is a top view thereof.
Figure 7:
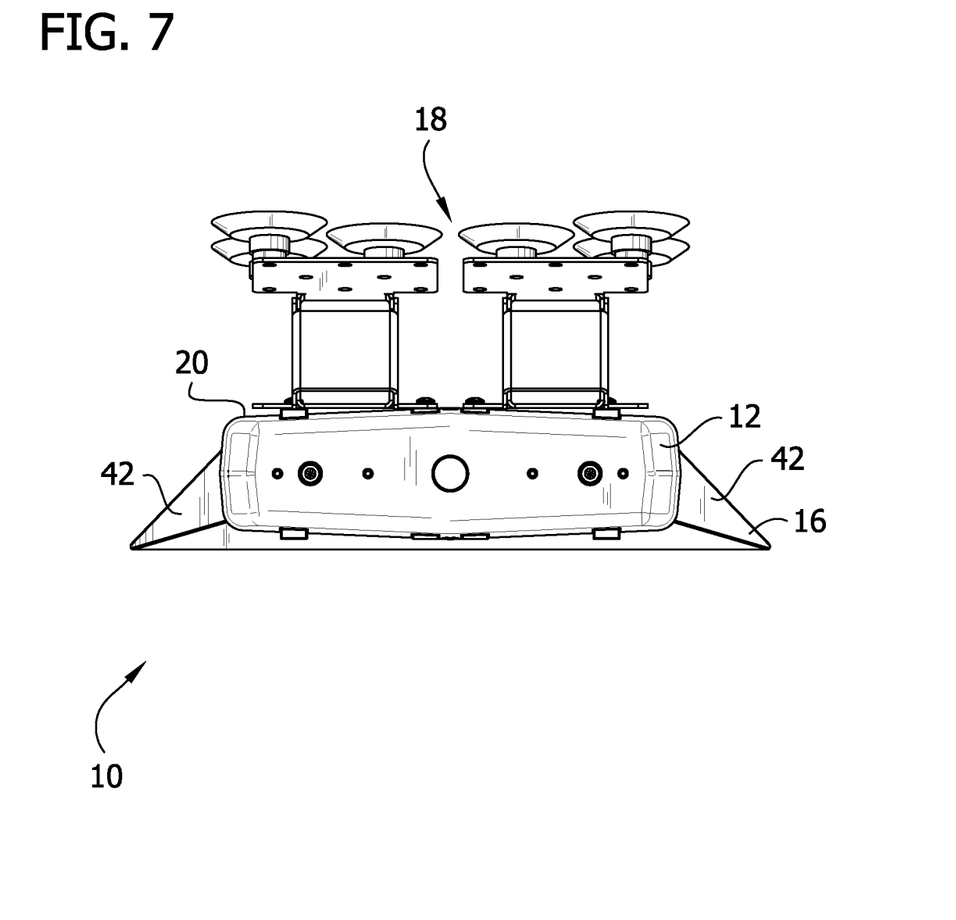
FIG. 7 is a rear view thereof.
Figure 8:
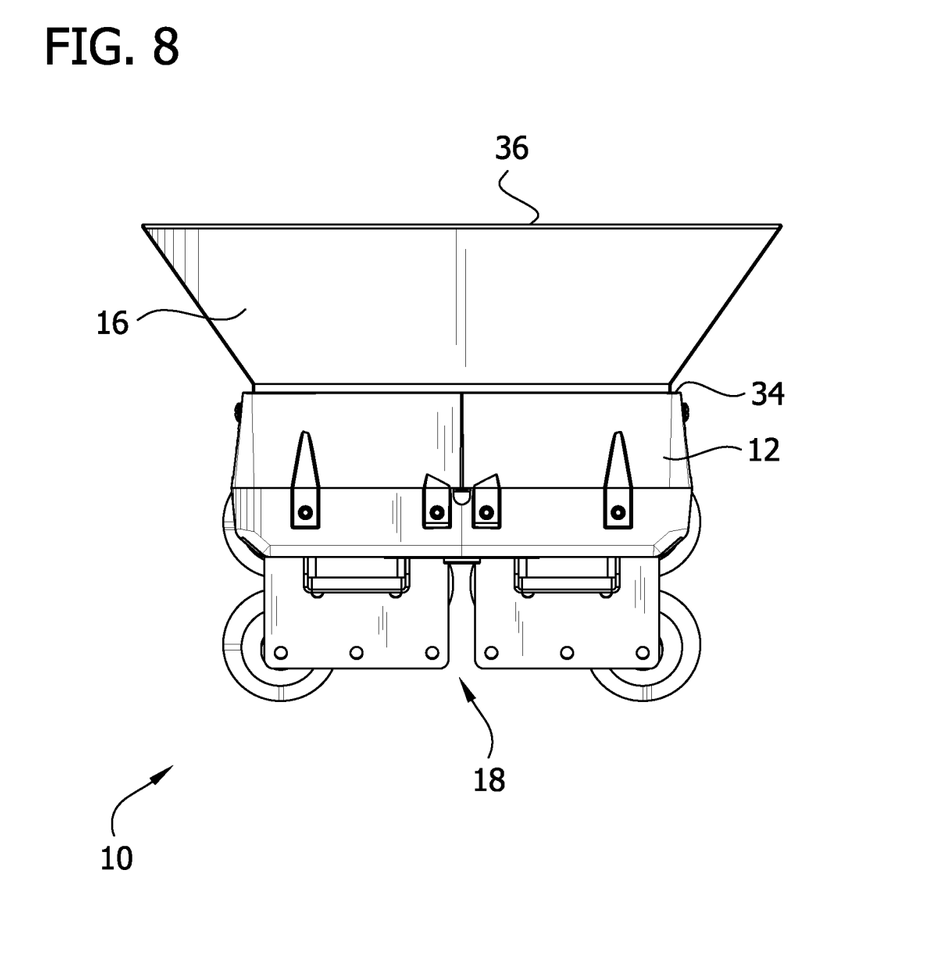
FIG. 8 is a bottom view thereof

In one embodiment, the visor 16 is pivotably mounted on the housing 12 to facilitate flush engagement of the remote end 36 of the visor with the windshield W. The visor 16 pivots, as best shown in FIGS. 5A and 5B, to an angle that allows for flush engagement of the remote end 36 with the windshield W. FIG. 5A shows a first possible position of the visor 16 relative to the housing 12, and FIG. 5B shows a second possible position, wherein the remote end 36 of the visor is pivoted downward from the first position. The visor 16 can be pivotably mounted on the housing 12 by at least one pivot pin, such as screw 38. More specifically, the visor 16 can be attached to the housing 12 at two pivot points located on opposite sides of the light transmission end 34 of the housing. As illustrated, the visor 16 is attached at the two pivot points by two screws 38 (only one screw can be seen). Positioning the visor 16 flush against the windshield W blocks light emitted from the light source 14 from reflecting back into the passenger compartment P of the vehicle V. The visor 16 blocks not only light emitted in a transverse direction, but also blocks light emitted in a forward direction that reflects off the windshield W and back into the vehicle V. FIG. 3 shows a cross-section of the windshield W to illustrate how the interior light assembly 10 is positioned flush against the windshield. Other ways of pivotably mounting the visor on the housing are within the scope of the present invention.

As shown, the first arm 28 and base 26 can be pivoted to bring the remote end 36 generally into engagement with the windshield W. The visor 16 is then pivoted downward in order to sit flush against the windshield W, thereby preventing emitted light from shining into the passenger compartment P of the vehicle V. To install the illustrated interior light assembly 10, a user would attach the suction cups 24 to the interior surface of the windshield W in any desired location. Once the interior light assembly 10 is attached to the windshield W, the user can pivot the visor 16 to an angle that generally follows the angle of the windshield. The user can also adjust the position of the pivotable bracket 22 so to facilitate generally flush engagement of the visor 16 with the windshield W.

As shown in FIGS. 2, 4, and 6-8, the visor 16 flares outward in a direction from the housing 12 toward the remote end 36 of the visor. The remote end 36 of the visor 16 is relatively wider in a transverse direction than the light transmission end 34 of the housing 12, as best observed in FIG. 8. In the illustrated embodiment, the remote end 36 of the visor 16 has a perimeter edge that is generally trapezoidal, although other shapes are within the scope of the invention. The visor 16 has two opposing side surfaces 42, which extend at an angle from the light transmission end 34 of the housing 12 to the remote end 36 of the visor. At the remote end 36 of the visor 16, the two opposing side surfaces 42 are located transversely outside a periphery of the housing 12. This flared or wide-mouth design allows for light to be seen sooner and at greater off-angles than if the visor 16 were not flared. The light emitted from the light source 14 can be seen by persons outside the vehicle V in a wider range of view in front of the vehicle when the visor 16 is flared.

Figure 10:
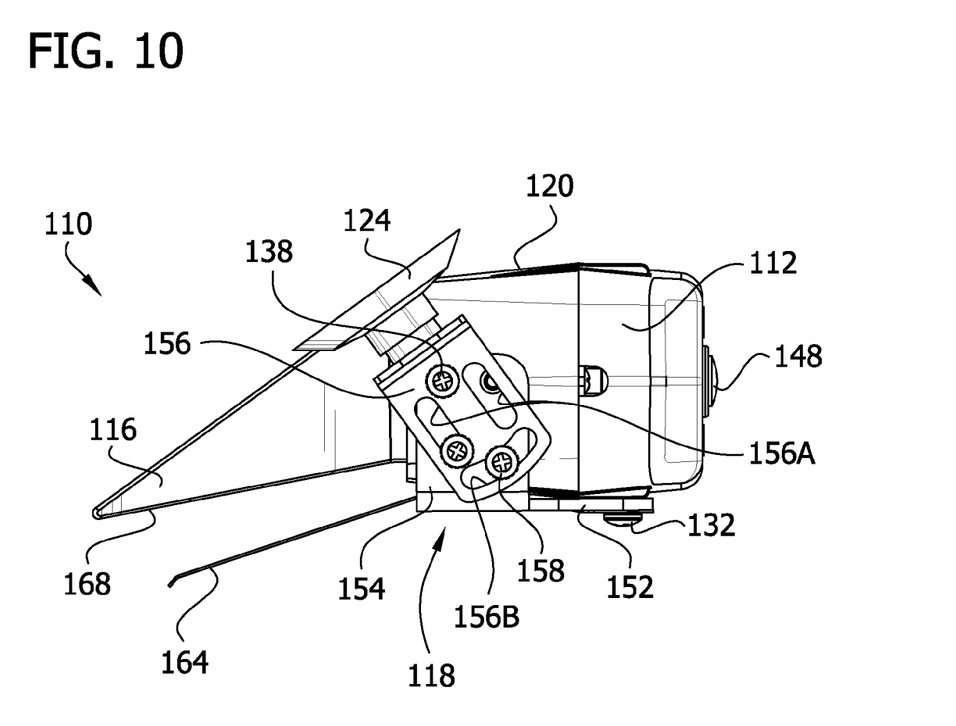
FIG. 10 is a right side view of the second embodiment, the left side view being a mirror image thereof.
Figure 11:
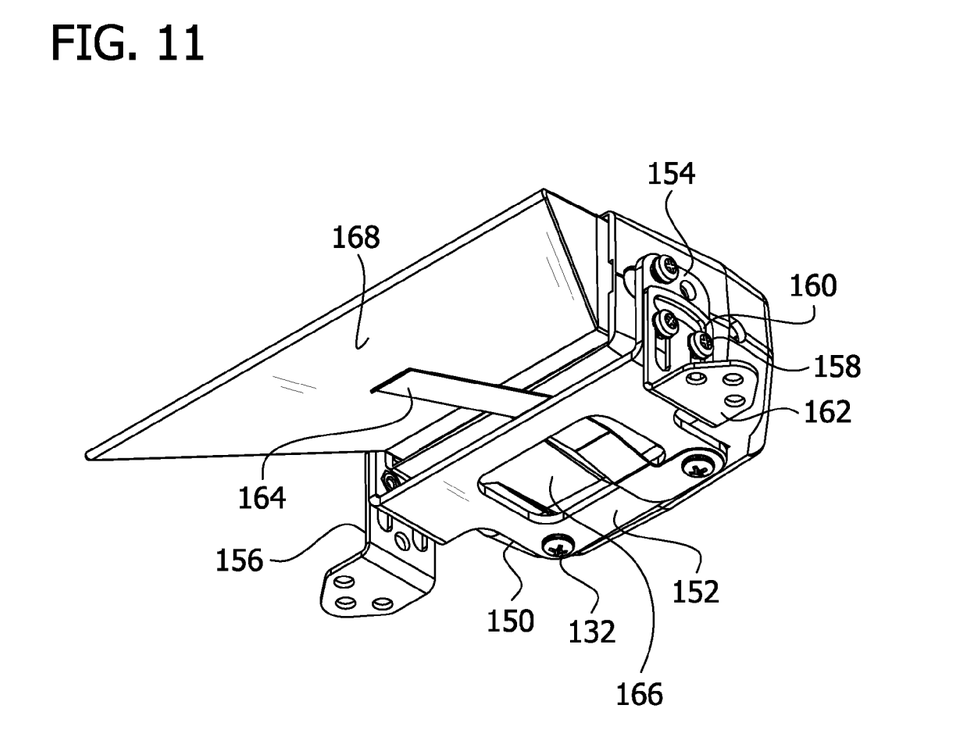
FIG. 11 is a bottom perspective view with suction cups removed to reveal additional structure.

FIGS. 9-11 illustrate another interior light assembly 110 according to the present invention. The interior light assembly 110 is substantially identical to the assembly 10 described above, except as noted. Like light source 14, light source 114 can include any kind of light known in the art, such as LED lights. The light source 114 can comprise one light or several lights. As illustrated, the light source 114 comprises one light. The light can be programmable for different flash patterns or steady burn. A switch 148 located on the housing may allow the user to select the flash patterns of the light (see FIG. 10). Different color lights, such as red, blue, amber, white, or green, can be used in the interior light assembly. The light source 114 can include several lights having different colors. The light source 114 can be powered by any suitable means, such as at least one self-contained battery or by being connected to the vehicle electric power system (not shown).

Interior light assembly 110 as illustrated in FIGS. 9-11 shows another configuration for a mounting assembly 118 according to the present invention. Mounting assembly 118 includes a base bracket 150 which is attached to the housing in any suitable manner, such as by screws 132. Base bracket 150 is generally U-shaped and includes a bottom 152 and two opposing sides 154 extending from the bottom. Base bracket 150 is sized such that housing 112 fits between the two opposing sides 154 of the base bracket. Both bottom 152 and opposing sides 154 of the base bracket 150 can be attached to the housing by suitable fasteners such as screws 132, best shown in FIG. 11. Other shapes and attachment means for the base bracket are within the scope of the present invention.

An attachment bracket 156 is disposed on the base bracket 150. In the illustrated embodiment, attachment bracket 156 comprises an L-shaped bracket mounted on the base bracket by screws 158. More specifically, the interior light assembly 110 includes two attachment brackets 156 disposed on opposing sides 154 of the base bracket 150. Attachment brackets 156 generally comprise an upright portion 160 and a foot portion 162 extending generally perpendicular to the upright portion. The upright portion 160 of each attachment bracket 156 is mounted on a respective side 154 of the base bracket.

Attachment brackets 156 can be disposed on the base bracket 150 in different positions to accommodate mounting the interior light assembly 110 in different locations in a vehicle V. For example, as shown in FIGS. 9 and 10, the attachment brackets 156 can be mounted on the side 154 of the base bracket 150 such that the foot portion 162 is relatively closer to the top surface 120 of the housing 112 than the upright portion 160. In this configuration, suction cups 124 are disposed on the foot portions 162 and are adapted to selectively and releasably mount the interior light assembly 110 to a windshield W of a vehicle V. An alternative configuration is shown in FIG. 11, wherein the attachment brackets 156 are mounted on the base bracket 150 such that the foot portion 162 is relatively further from the top surface 120 of the housing 112 than the upright portion 160. In this configuration, screws or other means are used to mount the interior light assembly 110 on the dashboard (or "deck") of a vehicle V. Other attachment bracket configurations and mounting locations are within the scope of the present invention.

The brackets 156 can be adjusted to different positions with respect to the housing 112. To that end, the bracket 156 is formed with elongate vertical slots 156A and an arcuate slot 156B. These slots 156A, 156B receive respective screws 158 into engagement with the base bracket 150. The angle of each bracket 156 can be changed by turning the bracket on pivot screw 138 to a desired angle. Tightening the screw 138 in the arcuate slot 156B can fix the angular position. When the pivot screw is not used (e.g., as shown in FIG. 11 in the deck mount configuration of the light assembly 110), the longitudinal (heightwise) adjustment of the bracket 156 can be made by sliding along the slots 156A. When the desired location is reached, the screws 158 can be tightened down to hold the bracket in position. Other ways of providing for adjustment of the brackets 156 may be provided within the scope of the present invention.

As seen in FIGS. 10 and 11, interior light assembly 110 also includes a retainer made of spring steel 164 is disposed on the bottom surface 166 of the housing 112. The retainer 164 is attached to the housing 112 using the same screw 132 used to attach the base bracket 150. In use, the retainer 164 engages the bottom surface 168 of the visor 116 to maintain the pivoted position of the visor as positioned by the user. This arrangement allows the visor 116 to remain flush against the windshield W although the pivot pins in conjunction with the weight of the visor could otherwise cause the visor to pivot downward. A retainer can be used on the first embodiment described above as well. Other biasing arrangements are within the scope of the present invention.

Figure 12:
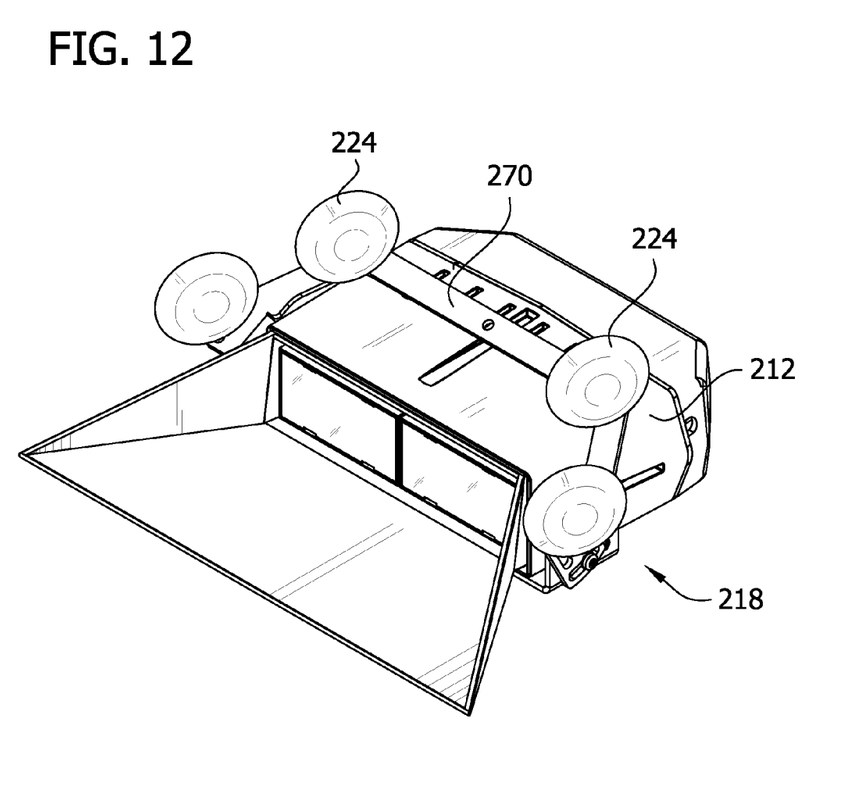
FIG. 12 is a perspective of a third embodiment of the interior light assembly.

FIG. 12 illustrates another embodiment of a mounting assembly 218. This mounting assembly 218 is substantially identical to the mounting assembly 118 described above, except as noted. The attachment brackets 256 further comprise an arm 270 linking the two attachment brackets. The arm 270 can extend over the top of the housing 212 when the attachment brackets 256 are mounted to facilitate use of suction cups 224, as illustrated. Alternatively, the arm 270 can extend over the bottom of the housing 212 when the attachment brackets 256 are mounted to facilitate deck mounting as described above. Other configurations are within the scope of the present invention.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. An interior light assembly for use in a vehicle, the interior light assembly comprising:
   a housing having a light transmission end constructed to pass light out of the housing;
   a light source located in the housing and arranged for emitting light in a direction to pass out of the light transmission end of the housing; and
   a visor extending from the light transmission end of the housing for blocking light from the light source in directions transverse to the light transmission end of the housing into a passenger compartment of the vehicle, the visor having an end remote from the housing shaped to engage a windshield of the vehicle, the visor being pivotably mounted on the housing to facilitate flush engagement of the remote visor end with the windshield.

2. The interior light assembly of claim 1 wherein the visor is attached to the housing at two pivot points located on opposite sides of the light transmission end of the housing.

3. The interior light assembly of claim 1 further comprising at least one pivot pin pivotably mounting the visor on the housing.

4. The interior light assembly of claim 3 further comprising two pivot pins pivotably mounting the visor on the housing.

5. The interior light assembly of claim 4 wherein the visor flares outward in a direction from the housing toward the remote end of the visor.

6. The interior light assembly of claim 1 further comprising a mounting assembly disposed on a top surface of the housing, the mounting assembly adapted to be releasably attached to the windshield of the vehicle.

7. The interior light assembly of claim 1 further comprising a retainer attached to the housing and adapted to maintain a selected position of the visor.

8. The interior light assembly of claim 7 wherein the mounting assembly includes at least one suction cup.

9. The interior light assembly of claim 2 wherein the retainer comprises a piece of spring steel.

10. The interior light assembly of claim 1 further comprising a mounting assembly adapted to be selectively attached to a deck of the vehicle and to a windshield of the vehicle.

11. An interior light assembly for use in a vehicle, the interior light assembly comprising:
   a housing having a light transmission end constructed to pass light out of the housing;
   a light source located in the housing and arranged for emitting light in a direction to pass out of the light transmission end of the housing; and
   a light visor mounted on the housing and extending from the light transmission end of the housing for blocking light from the light source in directions transverse to the light transmission end of the housing into a passenger compartment of the vehicle, the visor having an end remote from the housing shaped to engage a windshield of the vehicle, the visor flaring outward in a direction from the housing toward the remote end of the visor.

12. The interior light assembly of claim 11 wherein the remote end of the visor is relatively wider in a transverse direction than the light transmission end of the housing.

13. The interior light assembly of claim 11 wherein the remote end of the visor has a perimeter edge shaped to engage the windshield, the perimeter edge being generally trapezoidal.

14. The interior light assembly of claim 11 wherein the visor further comprises two opposing side surfaces, the two opposing side surfaces extending at an angle from the light transmission end of the housing to the remote end of the visor, such that the two opposing side surfaces extend to a location transversely outside a periphery of the housing at the remote end of the visor.

15. The interior light assembly of claim 11 wherein the visor is pivotally mounted on the housing to facilitate flush engagement of the remote visor end with the windshield.

16. The interior light assembly of claim 15 further comprising a retainer adapted to maintain a selected pivoted position of the visor.

17. The interior light assembly of claim 11 further comprising a mounting assembly disposed on a top surface of the housing, the mounting assembly adapted to be releasably attached to a windshield of a vehicle.

18. The interior light assembly of claim 1 further comprising a mounting assembly adapted to be selectively attached to a deck of the vehicle and to a windshield of the vehicle.

19. An interior light assembly for use in emergency vehicles, the interior light assembly comprising:
   a housing having a light transmission end constructed to pass light out of the housing;
   a mounting assembly disposed on the housing, the mounting assembly adapted to be releasably attached to the interior of the emergency vehicle;
   a light source located in the housing and arranged for emitting light in a direction to pass out of the light transmission end of the housing and through a windshield of the emergency vehicle; and
   a visor extending from the light transmission end of the housing for blocking light from the light source in directions transverse to the light transmission end of the housing into a passenger compartment of the emergency vehicle, the visor having an end remote from the housing shaped to engage a windshield of the vehicle, the visor being pivotably mounted on the housing to facilitate flush engagement of the remote visor end with the windshield, the visor flaring outward in a direction from the housing toward the remote end of the visor.

\* \* \* \* \*